(12) United States Patent
Hayton

(10) Patent No.: US 10,001,136 B2
(45) Date of Patent: Jun. 19, 2018

(54) PANEL ATTACHMENT SYSTEM

(71) Applicant: ROLLS-ROYCE PLC, London (GB)

(72) Inventor: Paul Robert Hayton, Bristol (GB)

(73) Assignee: ROLLS-ROYCE plc, London (GB)

( * ) Notice: Subject to any disclaimer, the term of this patent is extended or adjusted under 35 U.S.C. 154(b) by 601 days.

(21) Appl. No.: 14/333,040

(22) Filed: Jul. 16, 2014

(65) Prior Publication Data

US 2015/0050139 A1 Feb. 19, 2015

(30) Foreign Application Priority Data

Aug. 16, 2013 (GB) .................................. 1314668.3

(51) Int. Cl.
*F04D 29/40* (2006.01)
*F01D 25/24* (2006.01)
(Continued)

(52) U.S. Cl.
CPC ........... *F04D 29/40* (2013.01); *F01D 25/243* (2013.01); *F01D 25/26* (2013.01); *F01D 25/28* (2013.01); *F02C 7/00* (2013.01); *F02C 7/20* (2013.01); *F02C 7/32* (2013.01); *F02K 1/80* (2013.01); *F02K 1/82* (2013.01); *F05D 2230/54* (2013.01);
(Continued)

(58) Field of Classification Search
CPC ..... F02C 7/20; F02K 1/80; F02K 1/82; F04D 29/40; F05D 2240/90; F05D 2240/91; F05D 2260/31; F01D 2/243
See application file for complete search history.

(56) References Cited

U.S. PATENT DOCUMENTS 3,826,088 A 7/1974 Nash et al.
5,557,932 A * 9/1996 Nash ....................... F02K 1/822
60/266

(Continued)

FOREIGN PATENT DOCUMENTS

EP 0 344 877 A1 12/1989
EP 0397566 A1 11/1990
(Continued)

OTHER PUBLICATIONS

Dec. 19, 2014 Search Report issued in European Patent Application No. 14 17 7273.
(Continued)

*Primary Examiner* — Carlos A Rivera
*Assistant Examiner* — Kyle Thomas
(74) *Attorney, Agent, or Firm* — Oliff PLC

(57) ABSTRACT

A gas turbine engine exhaust panel mounting system comprising a panel, a casing and an attachment assembly for removably connecting the panel to the casing comprises a retaining portion, a clamping portion, and a 'C'-shaped connecting link.
The connecting link has a first attachment portion and an opposite second attachment portion with the first and second attachment portions being connected to one another by a center portion. Each of the first and second attachment portions is substantially parallel to one another and extends in the same direction from respective ends of the center portion. The first attachment portion is fixedly connected to the casing by the clamping portion, and the second attachment portion is slidingly connected to the panel by the retaining portion.

12 Claims, 4 Drawing Sheets

(51) Int. Cl.
- *F02C 7/32* (2006.01)
- *F01D 25/28* (2006.01)
- *F01D 25/26* (2006.01)
- *F02K 1/80* (2006.01)
- *F02K 1/82* (2006.01)
- *F02C 7/20* (2006.01)
- *F02C 7/00* (2006.01)

(52) U.S. Cl.
CPC ...... *F05D 2240/90* (2013.01); *F05D 2240/91* (2013.01); *F05D 2260/30* (2013.01); *F05D 2260/31* (2013.01); *F05D 2260/36* (2013.01)

(56) References Cited

U.S. PATENT DOCUMENTS

| | | | |
|---|---|---|---|
| 6,038,852 A | 3/2000 | Celi | |
| 2006/0102419 A1* | 5/2006 | Mitchell | E04B 1/8218 181/200 |
| 2007/0158527 A1* | 7/2007 | Farah | F02K 1/002 248/610 |
| 2009/0145133 A1* | 6/2009 | Murphy | F02K 1/82 60/770 |
| 2009/0293498 A1* | 12/2009 | Petty | F01D 25/28 60/796 |
| 2012/0233845 A1 | 9/2012 | Gerengi | |
| 2013/0318979 A1* | 12/2013 | Kramer | F02K 1/82 60/752 |

FOREIGN PATENT DOCUMENTS

| | | | |
|---|---|---|---|
| EP | 2 357 322 A2 | 8/2011 | |
| FR | 2271405 A1 * | 12/1975 | F02K 1/80 |
| JP | 2010-169164 A | 8/2010 | |

OTHER PUBLICATIONS

British Search Report issued in British Patent Application No. GB1314668.3 dated Mar. 18, 2014.

* cited by examiner

SECTION A-A

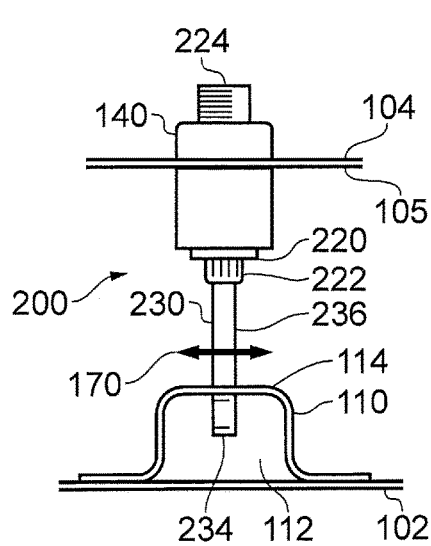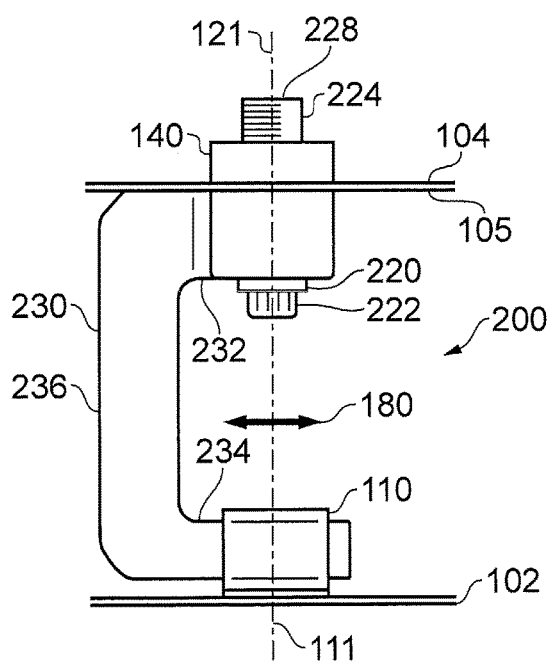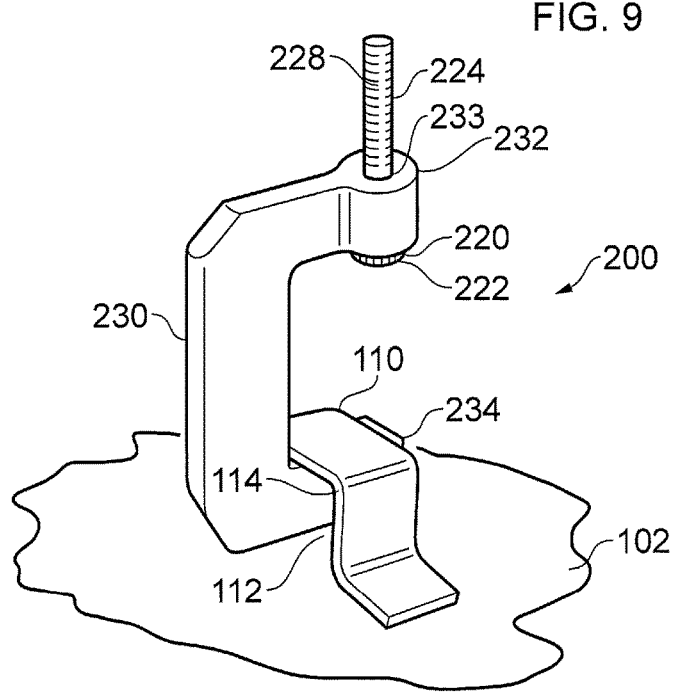

PANEL ATTACHMENT SYSTEM

This invention claims the benefit of UK Patent Application No. GB1314668.3, filed on 16 Aug. 2013, which is incorporated herein in its entirety.

FIELD OF THE INVENTION

The present invention relates to a panel attachment system and particularly, but not exclusively, to a panel attachment system for an exhaust gas duct.

BACKGROUND TO THE INVENTION

The exhaust duct for a gas turbine engine is conventionally a circular duct which connects to the turbine stage outlet of the engine. The use of a circular duct is convenient since it can be readily connected to the turbine outlet of the engine. In addition, thermal expansion of the exhaust duct resulting from the heat of the exhaust gas flow may be readily accommodated by the radial growth of the exhaust duct.

However, in many gas turbine engine installations it is desirable for the exit portion of the exhaust duct to be non-circular because this can make the mechanical installation of the exhaust duct into its supporting structure easier and more convenient.

In particular it is advantageous for the exhaust duct to be rectilinear in cross-section to facilitate the mounting of the exhaust duct within its surrounding structure.

Due to the need to accommodate dimensional changes in the exhaust duct resulting from the hot exhaust gases passing through the exhaust duct it is known to provide a duct mounting arrangement that independently accommodates both axial and lateral growth of the exhaust duct resulting from thermal expansion of the duct. Such mounting arrangements are required to accommodate movement of the duct both axially and laterally and can be mechanically complicated.

STATEMENTS OF INVENTION

According to a first aspect of the present invention there is provided a gas turbine engine exhaust panel mounting system comprising a panel, a casing and an attachment assembly for removably connecting the panel to the casing, the attachment assembly comprising:
- a retaining portion;
- a clamping portion; and
- a 'C'-shaped connecting link,
- the connecting link having a first attachment portion and an opposite second attachment portion, the first and second attachment portions being connected to one another by a centre portion, each of the first and second attachment portions being substantially parallel to one another and extending in the same direction from respective ends of the centre portion, the first attachment portion being fixedly connected to the casing by the clamping portion, and the second attachment portion being slidingly connected to the panel by the retaining portion.

The 'C'-shaped connecting link may be produced with any desired predetermined spacing between the first and second attachment portions. This allows the panel attachment assembly of the invention to be used to locate a panel at any desired spacing from a casing. This makes the assembly of the invention convenient and cost effective for a user.

Optionally, the clamping portion comprises a first end and an opposite second end, the first end having a slot adapted to accommodate the first attachment portion, the second end being connected to the casing.

The first end of the clamping portion is located within the slot and so requires no additional components to secure the connecting link to the casing. This makes the attachment of the connecting link to the casing simple and cost effective.

Optionally, the second end of the clamping portion comprises a threaded portion, the threaded portion extending through a hole in the casing, a clamping nut being threadingly engaged with the threaded portion such that as the clamping nut is tightened the first attachment portion is securely clamped within the slot.

By accommodating the first end of the clamping portion within the slot, the connecting link can be securely fastened to the casing by simply tightening a single clamping nut. This makes the attachment easy and quick to use and so makes it attractive to a user.

Optionally, the first attachment portion is provided with a notch, the notch being adapted to abut against the slot of the clamping portion.

The notch securely locates the slot in the desired position along the first attachment portion and prevents the connecting link from inadvertently becoming detached from the clamping portion. For example, during assembly of a panel to a casing it may be necessary to align and locate a plurality of attachment assemblies and any inadvertent detachment will be inconvenient for a user. This makes the assembly of the invention easier to assemble and thereby more convenient for a user.

Optionally, a centre axis of the clamping portion is coincident with a centre axis of the retaining portion.

This means that there is little or no bending stress applied to the clamping portion because the applied forces from the panel are generally aligned with the axis of the clamping portion. This enables the weight of the attachment system to be minimised and so makes the system more cost and weight efficient for a user.

Optionally, the centre portion is formed with a rectangular cross-sectional profile.

This provides a maximum bending stiffness in the plane of the connecting link so allowing the weight of the system to be minimised thereby making the attachment system more efficient.

Optionally, the width sides of the centre portion are streamlined.

Since cooling air flows pass between the panel and the casing it is desirable to minimise disruption to these air flows. By streamlining the width sides, i.e. the portion of the centre section that is incident to the air flow, the disruption to this air flow is minimised thus maximising the air flow's potential for providing cooling to the panel.

Optionally, the retaining portion comprises a recess adapted to accommodate the second attachment portion.

The second attachment portion is retained by the retaining portion but is able to move laterally and longitudinally in order to accommodate thermal growth of the panel relative to the casing. This enables the attachment system to maintain the alignment of the panel relative to the casing even during large temperature changes, for example during operation of the exhaust assembly.

Optionally, the retaining portion is formed with a top hat cross-sectional profile with the recess being located within the top hat profile.

The top hat profile is able to be easily and cost effectively produced from sheet metal thus making the attachment system simple and cost effective for a user.

Optionally, a surface of the casing is provided with an anti-rotation stop, the first attachment portion abutting against the anti-rotation stop to thereby prevent relative rotation between the first attachment portion and the anti-rotation stop.

The anti-rotation stop provides angular location of the connecting link relative to the casing surface during the assembly of the attachment system. By abutting against the first attachment portion, the anti-rotation stop ensures that the connecting link is correctly aligned without further user intervention.

In addition, the anti-rotation stop makes the tightening of the clamping easier for a user when assembling the attachment system. This is because the connecting link is prevented from rotation by the anti-rotation stop and so the user does not have to stop the connecting link from rotating during the assembly process. This makes the attachment system easier and more convenient for user.

Optionally, the retaining portion is formed from sheet metal or sheet metal alloy.

The retaining portion may be stamped from sheet metal or alternatively may be laser cut. This makes the retaining portion easy and cost effective to produce.

Optionally, the connecting link is formed from sheet metal or sheet metal alloy.

It also becomes possible to easily vary the spacing between the panel and the casing by simply altering the length of the centre portion of the connecting link. In this way it is simple to produce arrangements in which the panel is arranged at an angle to the casing by manufacturing a range of connecting links having gradually increasing centre section lengths.

Optionally, the sheet metal or sheet metal alloy has a thickness within the range of 4 mm to 6 mm.

Optionally, the clamping portion comprises a threaded fastener extending through the first attachment portion and being fixedly connected to the casing.

In an alternative arrangement, the first attachment portion of the connecting link is formed with a hole to accommodate a clamping portion in the form of a threaded fastener such as a bolt. This simplifies the structure of the attachment system but requires alignment of the bolt with a corresponding hole in the casing during the assembly process. This alternative arrangement is therefore best suited to panel and casing schemes where there is a large panel to casing clearance for access to the bolt.

Optionally, the clamping portion is integrally formed with the first attachment portion, the clamping portion comprising a threaded portion extending normal to the first attachment portion and parallel to the centre portion, the threaded portion extending through the casing and being threadingly secured thereto by a retaining nut.

In a further alternative arrangement the connecting link is formed from a material that has sufficient thickness to enable a threaded portion to be integrally formed adjacent and adjoining the first attachment portion. This results in the connecting link and clamping portion being integrally formed which further simplifies the attachment system making it simpler to use and more cost effective. It may also be possible to reduce the weight of the connecting link and clamping portion pair so making the attachment system even more weight efficient.

This arrangement does however require that the connecting links are located against and secured to the casing before the panel is offered up to position because the connecting links cannot be slid laterally into position.

In an alternative arrangement, a panel attachment system may comprise:
 a panel;
 a casing;
 a single fixed mount; and
 a plurality of panel mounting systems as defined by the first embodiment of the invention,
 the fixed mount fixedly connecting the panel and the casing, each of the retaining portions being fixedly connected to the panel, and each of the clamping portions being fixedly connected to the casing, such that each of the corresponding connecting links are parallel to one another.

The use of a plurality of panel attachment assemblies enables a panel to be attached to a casing while accommodating any thermal growth of the panel and still maintaining the positional arrangement of the panel and casing.

A single fixed mount is positioned so that the thermal growth of the panel occurs in directions that are predictable and optimum for the particular design.

BRIEF DESCRIPTION OF THE DRAWINGS

There now follows a description of an embodiment of the invention, by way of non-limiting example, with reference being made to the accompanying drawings in which:

FIG. 7 shows a perspective view of a panel attachment assembly according to a second embodiment of the invention;

FIG. 8 shows an end view of the attachment assembly of FIG. 7;

FIG. 9 shows an elevational view of the attachment assembly of FIG. 7;

It is noted that the drawings may not be to scale. The drawings are intended to depict only typical embodiments of the invention, and therefore should not be considered as limiting the scope of the invention. In the drawings, like numbering represents like elements between the drawings.

DETAILED DESCRIPTION

Figure 1:
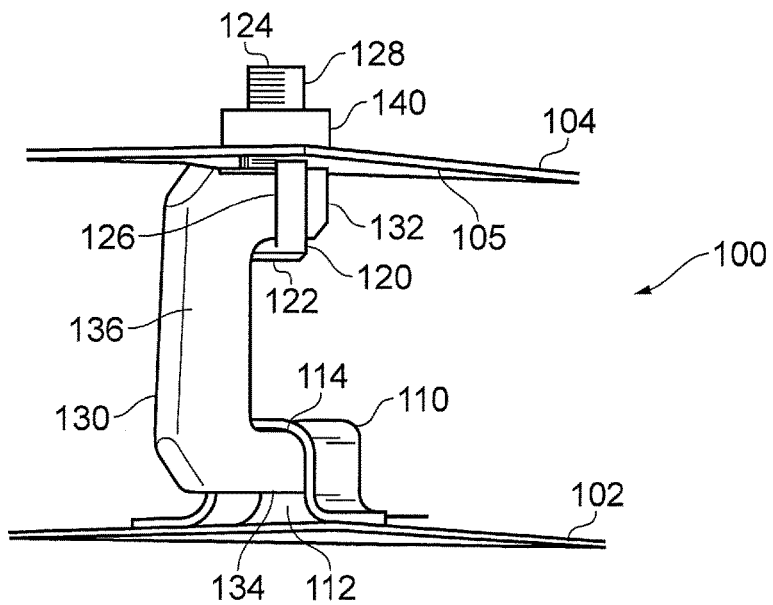
FIG. 1 shows a perspective view of a panel attachment assembly according to a first embodiment of the invention.
Figure 2:
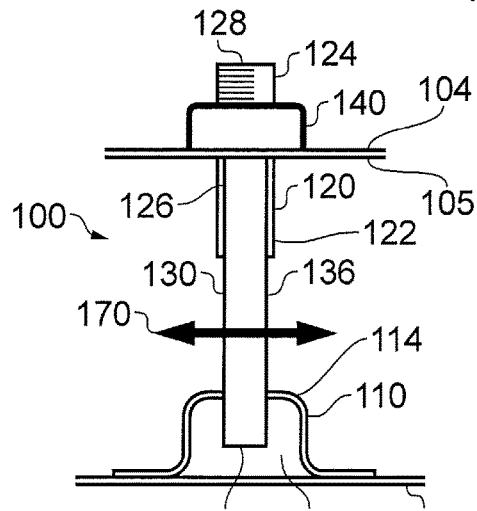
FIG. 2 shows an end view of the attachment assembly of FIG. 1.
Figure 3A:
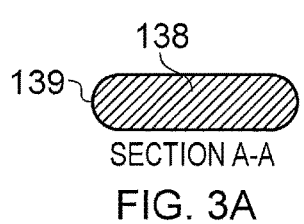
FIG. 3A shows a cross-section through the centre portion of the connecting link of the attachment assembly of FIG. 1.
Figure 3:
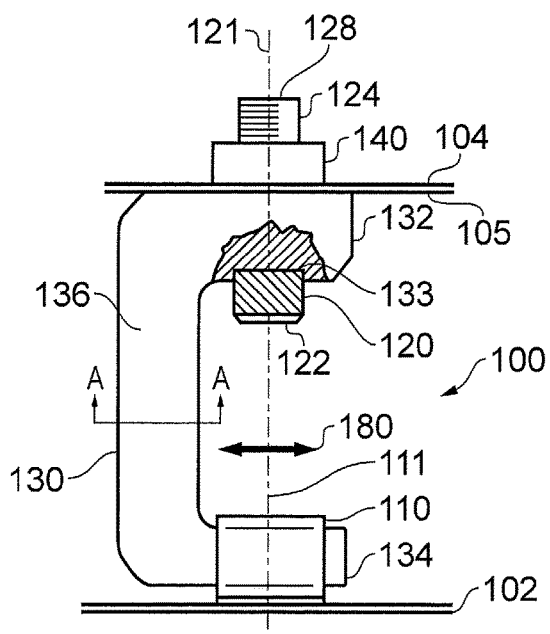
FIG. 3 shows an elevational view of the attachment assembly of FIG. 1.
Figure 4:
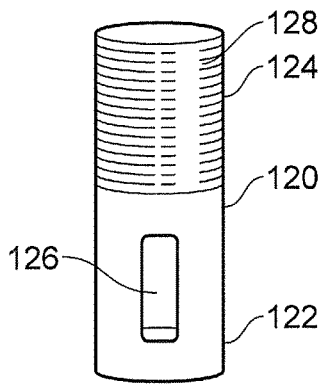
FIG. 4 shows a perspective view of the clamping portion of the attachment assembly of FIG. 1.
Figure 5:
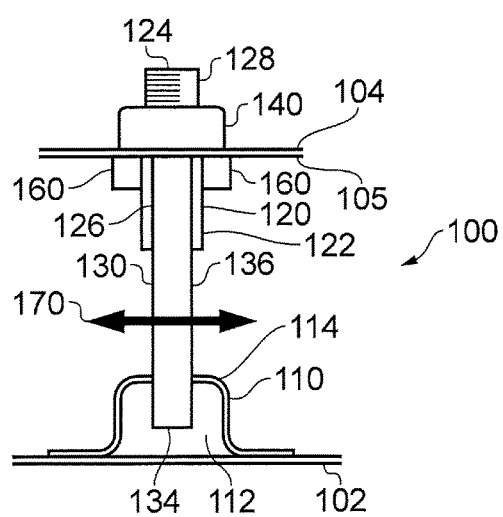
FIG. 5 shows the end view of FIG. 2 with the addition of an anti-rotation stop.
Figure 6:
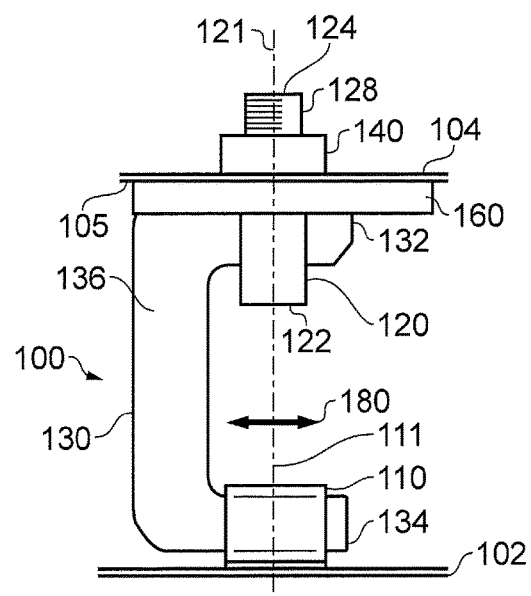
FIG. 6 shows the elevational view of FIG. 3 with the addition of the anti-rotation stop.

Referring to FIGS. 1 to 6, a panel attachment assembly according to a first embodiment of the invention is designated generally by the reference numeral 100. The panel attachment assembly 100 removably connects a panel 102 to a casing 104 of an exhaust system (not shown) for a gas turbine engine (not shown)

The panel attachment apparatus 100 has a retaining portion 110, a clamping portion 120 and a 'C'-shaped connecting link 130.

The retaining portion 110 comprises a recess 112 that is formed within a top hat cross-sectional profile 114 of the retaining portion 110. The retaining portion 110 is formed from sheet metal that is press formed into a top hat cross-sectional profile 114. In alternative arrangement the retaining portion 110 may be formed from a fibre reinforced material, such as a carbon fibre reinforced composite, that is moulded into the top hat cross-sectional profile 114.

The connecting link 130 is generally 'C'-shaped and comprises a first attachment portion 132, a second attachment portion 134 and a centre portion 136. The first attachment portion 132 extends from one end of the centre portion 136 while the second attachment portion 134 extends from the other opposite end of the centre portion 136. Each of the first and second attachment portions 132,134 extend from the centre portion 136 parallel to one another and in the same direction.

The connecting link 130 is formed from sheet metal. In the present embodiment the sheet metal is between 4 mm and 6 mm in thickness. In other arrangements the sheet metal may be of different thickness. In further arrangements the connecting link 130 may be formed from a fibre reinforced material, such as a carbon fibre reinforced composite material.

The centre portion 130 is formed with a generally rectangular cross-sectional area 139. The width sides 139 of the rectangular cross-section 138 are streamlined in order to minimise the disruption they produce on an air flow passing over the centre portion 130.

The clamping portion 120 comprises a first end 122 and an opposite second end 124. The second end 124 is formed as a threaded portion 128. A slot 126 is formed through the first end 122 of the clamping portion 120.

The threaded portion 128 of the clamping portion 120 extends through a corresponding hole in the casing 104 and is secured to the casing 104 by a clamping nut 140.

In the present embodiment the axis (or centre-line) of the clamping portion 120 is coincident with the axis (or centre-line) of the retaining portion 110. This ensures that there are no or minimal bending loads transmitted between the clamping portion 120 and the retaining portion 110. In other arrangements of the invention the axis of the clamping portion 120 may be offset from the axis of the retaining portion.

The first attachment portion 132 is received within the slot 126 in the clamping portion 120. In the present arrangement, a notch 133 is provided in a side of the first attachment portion 132 distal to the surface 105 of the casing 104. As the clamping portion 120 is drawn towards the surface 105 of the casing 104, the slot 126 is received in the notch 133 so as to positively locate the first attachment portion 132, and so the connecting link 130, in the clamping portion.

An anti-rotation stop 160 is provided on an underside surface 105. The anti-rotation stop 160 takes the form of two elongate pads that are fastened to the surface 105 of the casing 104 and are positioned along opposing sides of the first attachment portion 132 of the connecting link 130.

Once assembled the attachment assembly 100 allows for small degrees of lateral movement 170 and longitudinal movement 180 between the second attachment portion 134 and the retaining portion 110. This lateral and longitudinal movement 170,180 accommodates thermal growth of the panel as it is subjected to the passage of hot exhaust gases over its surface.

Referring to FIGS. 7 to 9, a panel attachment assembly according to a second embodiment of the invention is designated generally by the reference numeral 200. Features of the panel attachment assembly 200 which correspond to those of panel attachment assembly 100 have been given corresponding reference numerals for ease of reference.

The panel attachment assembly 200 has a retaining portion 110, a clamping portion 220 and a 'C'-shaped connecting link 230.

The retaining portion 110 is identical in form and function to that described above in respect of the first embodiment of the invention.

The connecting link 230 is similar to that described above for the first embodiment but in this arrangement the first attachment portion 232 is provided with a hole 233 that accommodates the clamping portion 220. In this arrangement the clamping portion 220 is a threaded fastener such as a threaded bolt.

In order to assemble the attachment assembly 200 it is necessary to first position the connecting link 230 between the panel 102 and the casing 104 with the second attachment portion 234 located in the recess 112 defined by the retaining portion 110.

Once the hole 233 in the first attachment portion 232 is aligned with the corresponding hole in the casing 104 the threaded fastener 220 can be passed through the aligned holes and the clamping nut 140 fitted. By tightening the clamping nut 140, the connecting link 230 can be tightly secured against the surface 105 of the casing 104.

The panel attachment assembly 200 allows the same degree of lateral and longitudinal movement 170,180 resulting from thermal growth of the panel 102 as is the case for the first embodiment of the invention.

Figure 10:
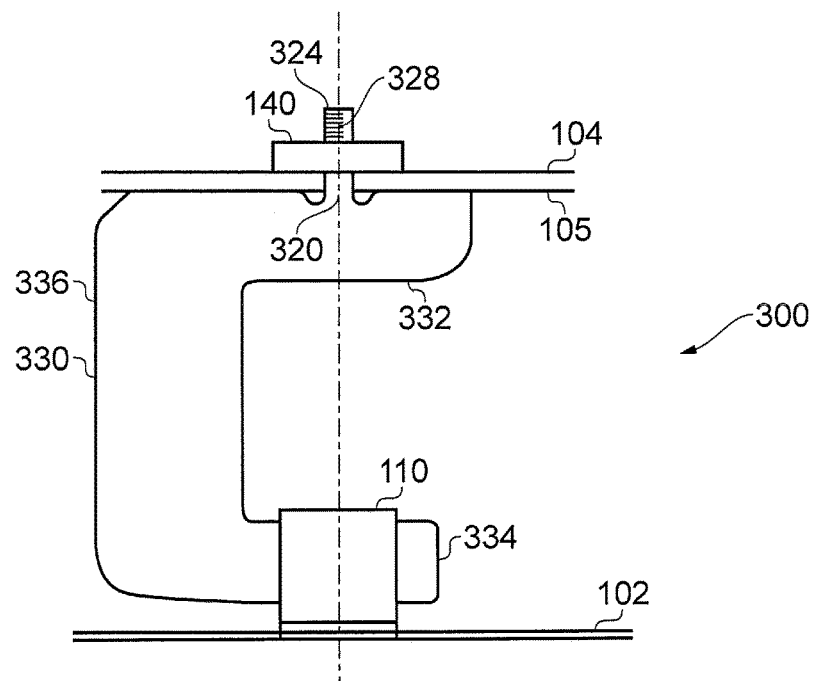
FIG. 10 shows a perspective view of a panel attachment assembly according to a third embodiment of the invention.

Referring to FIG. 10, a panel attachment assembly according to a third embodiment of the invention is designated generally by the reference numeral 300. Features of the panel attachment assembly 300 which correspond to those of panel attachment assembly 100 have been given corresponding reference numerals for ease of reference.

The panel attachment assembly 300 has a retaining portion 110, a clamping portion 320 and a 'C'-shaped connecting link 330.

The retaining portion 110 is identical in form and function to that described above in respect of the first embodiment of the invention.

Furthermore, the connecting link 330 is also similar to that described above for the first embodiment but in this arrangement the first attachment portion 332 is provided with a protrusion in the form of the clamping portion 320. This protrusion is formed as a threaded portion 328. In other words, the threaded portion 328 is integrally formed with the first attachment portion 332.

Assembly of the attachment assembly 300 requires initial alignment of the threaded portion 328 with the corresponding hole in the casing 104 and insertion of the threaded portion 328 into the hole. In other words each of the connecting links 330 has to be first attached to the casing 104.

The clamping nut 140 is then fitted to the threaded portion 328. By tightening the clamping nut 140, the connecting link 330 can be tightly secured against the surface 105 of the casing 104.

With the connecting links 330 now secured to the surface 105 of the casing 104, the panel can be positioned with the second attachment portions 334 located in the corresponding recesses 112 defined by the retaining portions 110.

The panel attachment assembly 300 allows the same degree of lateral and longitudinal movement 170,180 resulting from thermal growth of the panel 102 as is the case for the first embodiment of the invention.

Figure 11:
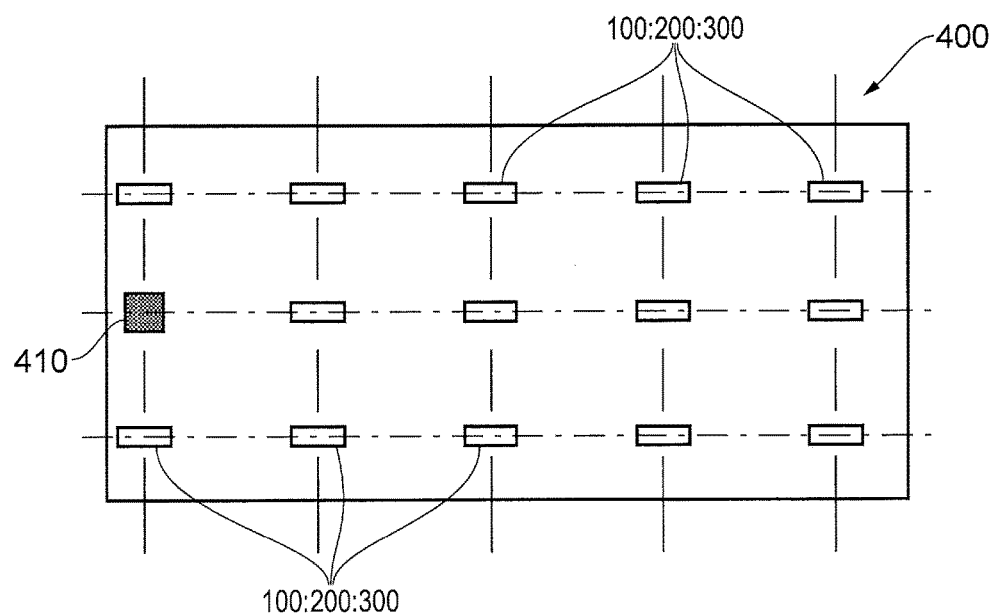
FIG. 11 is a schematic plan view of panel attachment system according to a fourth embodiment of the invention.

Referring to FIG. 11, a panel attachment system according to a fourth embodiment of the invention is designated generally by the reference numeral 400. Features of the panel attachment system 400 which correspond to those of panel attachment assembly 100 have been given corresponding reference numerals for ease of reference.

The panel attachment system 400 has a panel 102 that is spaced apart from a casing 104. A single fixed mount 410 fixedly connects the panel 102 and the casing 104. A plurality of panel attachment assemblies 100:200:300 are then arranged across the surface 105 of the casing 104, and the panel 102.

The panel attachment assemblies 100:200:300 are arranged row-wise across the panel/casing surface with each of the connecting links 130:230:330 arranged so that they each lie in the same plane or in parallel planes. This ensures that any lateral and longitudinal movement 170,180 of the panel 102 relative to the casing 104 resulting from thermal growth of the panel 102 can readily be accommodated by relative movement between the second attachment points 134,234,334 and the retaining portions 110.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

The invention claimed is:

1. A gas turbine engine exhaust panel mounting system comprising:
   a gas turbine engine exhaust panel;
   a gas turbine engine exhaust casing; and
   an attachment assembly including:
      a retaining portion;
      a clamping portion; and
      a 'C'-shaped connecting link,
         the 'C'-shaped connecting link having a first attachment portion and an opposite second attachment portion, the first and second attachment portions being connected to one another by a centre portion, each of the first and second attachment portions being substantially parallel to one another and extending in the same direction from respective ends of the centre portion, the first attachment portion being fixedly connected to the gas turbine engine exhaust casing by the clamping portion, and the second attachment portion being slidingly connected to the gas turbine engine exhaust panel by the retaining portion,
         wherein the clamping portion includes a first end and an opposite second end, the first end having a slot formed through the first end and adapted to accommodate the first attachment portion, the second end being connected to the gas turbine engine exhaust casing.

2. The gas turbine engine exhaust panel mounting system as claimed in claim 1, wherein the second end of the clamping portion comprises a threaded portion, the threaded portion extending through a hole in the gas turbine engine exhaust casing, a clamping nut being threadingly engaged with the threaded portion such that as the clamping nut is tightened the first attachment portion is securely clamped within the slot.

3. The gas turbine engine exhaust panel mounting system as claimed in claim 1, wherein the first attachment portion is provided with a notch, the notch being adapted to abut against the slot of the clamping portion.

4. The gas turbine engine exhaust panel mounting system as claimed in claim 1, wherein a centre axis of the clamping portion is coincident with a centre axis of the retaining portion.

5. The gas turbine engine exhaust panel mounting system as claimed in claim 1, wherein the centre portion is formed with a rectangular cross-sectional profile.

6. The gas turbine engine exhaust panel mounting system as claimed in claim 5, wherein the width sides of the centre portion are streamlined.

7. The gas turbine engine exhaust panel mounting system as claimed in claim 1, wherein the retaining portion comprises a recess adapted to accommodate the second attachment portion.

8. The gas turbine engine exhaust panel mounting system as claimed in claim 7, wherein the retaining portion is formed with a top hat cross-sectional profile with the recess being located within the top hat cross-sectional profile.

9. The gas turbine engine exhaust panel mounting system as claimed in claim 1, wherein a surface of the gas turbine engine exhaust casing is provided with an anti-rotation stop, the first attachment portion abutting against the anti-rotation stop to thereby prevent relative rotation between the first attachment portion and the anti-rotation stop.

10. The gas turbine engine exhaust panel mounting system as claimed in claim 1, wherein the retaining portion is formed from sheet metal or sheet metal alloy.

11. The gas turbine engine exhaust panel mounting system as claimed in claim 1, wherein the 'C'-shaped connecting link is formed from sheet metal or sheet metal alloy.

12. The gas turbine engine exhaust panel mounting system as claimed in claim 11, wherein the sheet metal or sheet metal alloy has a thickness within the range of 4 mm to 6 mm.

* * * * *